United States Patent Office 2,861,636
Patented Nov. 25, 1958

2,861,636

TIME SETTING CLAY CEMENT AND METHOD OF CORRECTING LOST CIRCULATION

Joseph U. Messenger, Dallas, Tex., assignor, by mesne assignments, to Socony Mobil Oil Company, Inc., a corporation of New York No Drawing. Application April 18, 1952
Serial No. 283,129

14 Claims. (Cl. 166—29)

This invention relates to cements and relates more particularly to a time setting clay cement.

In the drilling or treatment of bore holes in the earth, it is frequently necessary or desirable to employ a material which may be pumped to a desired position in the bore hole and which material will thereafter set to a high consistency. For example, in the rotary drilling of a well for petroleum oil or gas, highly permeable or cavernous formations are frequently encountered into which the drilling fluid flows to be irretrievably lost resulting in increased expense in drilling the well and frequently making further drilling impossible. One method of treating the well to correct lost returns, as this loss of the drilling fluid is termed, is to pump a cement slurry, such as a slurry of Portland cement, into the bore hole at the loss zone, as the highly permeable or cavernous formation is termed, so that the bore hole will be filled with cement and some of the cement will enter the loss zone, and permitting the cement to set therein whereby the loss zone becomes sealed. After the cement has set, the plug of cement in the bore hole is drilled out and drilling of the well is continued. However, ordinary cement slurries are not entirely satisfactory. For example, ordinary cement slurries have comparatively high water losses and as a consequence thereof in an open bore hole the water is occasionally forced from the cement slurry at such a rapid rate by the pumping pressures that a flash set of the cement occurs with attendant hazards of stuck drill pipe. Further, ordinary cement slurries require a long time to set to the required consistency during which time the drilling equipment is idle with consequent increase in the cost of drilling the well. Additionally, not only is time required to drill out the cement plug from the bore hole but the cement cuttings contaminate the drilling fluid, deleteriously affecting its viscosity and gel strength and requiring the taking of correcting measures. Furthermore, drilling out of the cement plug frequently causes deviation of the well from the vertical or desired direction. Lastly, ordinary cement slurries are easily dispersed by the fluids naturally present in the loss zone. To avoid the drawback of the possible deviation of the well bore hole resulting from drilling of the cement plug, gel cements, comprising bentonite and Portland or oil well cement, are often employed, but the danger of a flash set and their easy dispersibility have militated against their wide spread use. Quick setting cements, such as those containing calcium sulfate or organic compounds, have been employed to avoid long setting times but here also the danger of a flash set has restricted their use.

It is an object of this invention to provide a composition which upon admixture with water will have time-setting properties. It is another object of this invention to provide a time-setting clay cement. It is another object of this invention to provide a cement which sets within a comparatively short period of time but which is sufficiently fluid to be pumpable for a comparatively long period of time. It is another object of this invention to provide a cement which is not easily dispersible by well fluids. It is another object of this invention to provide a method for correcting lost returns in the drilling of a well. It is another object of this invention to minimize setting time and to eliminate contamination of drilling fluid, deviation of the well, and the hazard of stuck drill pipe in correction of lost returns. It is another object of this invention to provide a material which may be employed for various purposes in the drilling or treatment of bore holes in the earth. Further objects of the invention will become apparent from the following description thereof.

The invention is predicated upon my discovery that a cement comprising a major proportion of a clay which has gel strength properties and a minor proportion of activated silica, activated alumina, or silica-alumina has unique properties. I have found, for example, that such a cement when admixed with water forms a slurry which initially has a viscosity and gel strength less than the viscosity and gel strength of a slurry having the same percentage of water but containing the same amount of clay. I have also found that an aqueous slurry of such a mixture of clay and activated silica, activated alumina, or silica-alumina is time setting and will set or gel within a time which is much shorter than the setting time of ordinary Portland cements. Further, the consistency of an aqueous slurry of the clay cement after setting will be higher than the consistency of a slurry containing the same amount of water and clay or a slurry containing the same amount of water and activated silica, activated alumina, or silica-alumina, which slurries have been allowed to remain quiescent for the same period of time as the setting time of the aqueous slurry of clay cement. Furthermore, I have found that the water loss of an aqueous slurry of such a cement is low. While an aqueous slurry of such a clay cement will not set to the degree of hardness usually obtained with Portland cement for example, the properties of such a clay cement render it highly useful for various purposes and particularly useful in drilling or treatment of bore holes in the earth.

Before proceeding with a more detailed description of the invention, an explanation of the terms "gel strength" and "water loss" employed herein will be given.

By gel strength, I mean the property of a slurry of requiring the application of a finite minimum stress in order to initiate shear in the slurry, and the gel strength of a slurry may be expressed in absolute units as the force per unit area required to initiate shear in the slurry. By clay which has gel strength properties, I mean a clay an aqueous slurry of which exhibits gel strength. The property of gel strength is well known and is of particular interest in the art of drilling fluids since the gel strength property of a drilling fluid assists the fluid to support cuttings and carry them from the bore hole and prevents the cuttings and the weighting materials in the drilling fluid from settling to the bottom of the bore hole in the event circulation of the drilling fluid is stopped or the drilling fluid otherwise becomes quiescent. The gel strength of a slurry of any clay, where the gel strength is of the order encountered in drilling fluids, may be determined by the procedures set forth in the publication of the American Petroleum Institute identified as "API RP 29, Recommended Practice for Standard Field Procedures for Testing Drilling Fluids, With Appendix, Manual of Procedures for Laboratory Evaluation of Drilling Mud Materials, American Petroleum Institute, Dallas, Texas (1950)."

The set or consistency of a slurry can be expressed in terms of the gel strength of the slurry. An instrument commonly employed for measuring gel strength of a slurry, where the gel strength of the slurry is of the order encountered in drilling fluids, is the Stormer viscometer and this instrument comprises generally a hollow, rotatable cylinder having a flexible line wound around the shaft thereof. The cylinder is submerged in the slurry whose gel strength is to be measured and weights are connected to the line until the total weight is sufficient to cause the cylinder to rotate. The total of the weights connected to the line, expressed usually in grams, is regarded as the gel strength of the slurry. Knowing the area of the cylinder in contact with the slurry and the force applied thereto by the weights attached to the line, the absolute value of the gel strength in force per unit area of slurry to break the slurry can be calculated.

The Stormer instrument ordinarily cannot be employed where the gel strength of the slurry exceeds about 1000 grams Stormer. Where the gel strength exceeds about 1000 grams Stormer other means of measuring gel strength are required. A simple method of measuring high gel strengths involves the use of a cylinder having its longitudinal surface serrated axially for a distance from one end, a hanger or other means for attachment of a line at the other end, and an air passageway leading through the cylinder from the end surface nearest the serrated portion to a point beyond the serrated portion. The cylinder is placed vertically in a container with the serrated portion bottommost and the end surface containing the port of the air passageway flush with the bottom of the container, and the slurry is placed in the container to a level to just cover the serrated portion of the cylinder. A line is connected to the hanger or other means of attachment, the line is passed over a pulley supported above the container, and weights are attached to the line until the cylinder is pulled loose from the slurry. The only force opposing the pulling force of the weights is the resistance to shear of the slurry, the pressure of the atmosphere being equalized at both ends of the cylinder by reason of the air passageway, and therefore the weight required to pull the cylinder loose from the slurry is a measure of the gel strength of the slurry. Knowing the surface area of the serrated portion of the cylinder and the weight required to pull the cylinder loose from the slurry, the gel strength expressed in force per area can be calculated. Knowing the gel strength in force per unit area equal to one unit of gel strength expressed in unit weights by the Stormer instrument, the gel strength as determined by the method described can be converted into equivalent unit weights Stormer.

Water loss of a slurry as employed herein is the conventional corrected 30-minute American Petroleum Institute water loss. This water loss is measured by placing 600 cubic centimeters of the slurry in an upright cylindrical chamber having a filter medium at the bottom thereof and an orifice below the filter medium leading to a pipe provided with a valve. A pressure of 100 pounds per square inch is imposed upon the slurry in the chamber and the valve is opened, the pressure on the slurry being maintained throughout the measurement. The water loss is the amount of water leaving the chamber through the pipe for a period of thirty minutes following any initial surge of slurry.

The clay constituting the major portion of the clay cement is any earth material commonly regarded as a clay, an aqueous slurry of which has gel strength properties. Clays are native hydrous silicates of alumina and may be characterized as having the empirical formula:

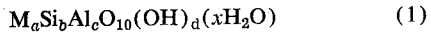
$$M_aSi_bAl_cO_{10}(OH)_d(xH_2O) \qquad (1)$$

where

M is an alkali or alkaline earth metal, or hydrogen, and
$a=0$ to 4,
$b=3$ to 4,
$c=2$ to 4,
$d=2$ to 4, and
$x=0$ to 14.

with clays having gel strength properties, M in the above empirical formula is sodium and $a$ is at least 1.

Any clay having gel strength properties may be employed in the invention. An example of a suitable clay is bentonite. However, while bentonite and any other clay having gel strength properties may be employed in the invention, it has been found that some clays are more effective than others with respect to the degree of set obtained with an aqueous slurry of a mixture of the clay and activated silica, activated alumina, or silica-alumina. Where a maximum degree of set is desired, I prefer to employ the clay mined from one source in California and known commercially as "McKittrick Light" clay or to employ clays similar to this clay. McKittrick Light clay contains quartz, dolomite, calcite, albite, and about forty percent by weight of montmorillonite. This clay is also characterized by containing comparatively small amounts of water soluble salts, i. e., less than about 2.0 percent by weight of water soluble salts, whereas other clays having gel strength properties often contain larger quantities of salts.

In connection with the presence of salts in the clays, various salts may inhibit the gel strength of clay slurries. For example, calcium chloride may react with some clays to reduce ultimately the gel strength of aqueous slurries of the clays. Sodium chloride may have the same effect depending upon its concentration. Accordingly, slurries of some clays may not exhibit gel strength because of the presence of these inhibiting salts in the clays themselves or because of the presence of these inhibiting salts in the water employed in making a slurry of the clay. However, these clays may be employed in the invention when freed of inhibiting salts and, when making slurries of these clays, employing water relatively free of inhibiting salts.

The minor portion of the clay cement comprises activated silica, activated alumina, or silica-alumina. The activated silica, activated alumina, or silica-alumina which is employed in the invention can be the activated silica, activated alumina, or silica-alumina which is known in the art of hydrocarbon conversion and has been used therein extensively, with or without admixture with various metallic oxides, as catalysts for hydrocarbon conversion reactions such as hydroforming, aromatization, dehydrogenation, hydrogenation, cracking, dealkylation, alkylation, polymerization, etc. The methods of preparation of activated silica, activated alumina, and silica-alumina are well known. However, several examples of methods of preparation will be given herein.

Activated silica may be prepared by acidifying an aqueous solution of sodium silicate as by the addition of hydrochloric acid whereby silica gel precipitates from the solution. The precipitated silica gel is then washed until substantially free from salts, the washing being most effectively carried out by employing an aqueous solution of an ammonium salt, such as ammonium chloride, or a dilute solution of an acid, such as hydrochloric acid, as the washing medium and following this wash with a water wash. Thereafter, the silica gel is dried at a temperature of 100° to 125° C. for two to six hours and then calcined at a temperature of about 250° C. to 650° C.

Activated alumina may be prepared from pure aluminum amalgamated with mercury by peptizing with a one percent solution of acetic acid in water at about 60° C. to produce an ultra sol, centrifuging the sol to remove particles of mercury and aluminum, drying the sol at a temperature between about 50° C. and 100° C., and finally calcining at a temperature between about 450° C. and 600° C.

Another method of preparing activated alumina involves calcination of naturally hydrated alumina. For example, activated alumina may be prepared by calcining crystalline aluminum orthohydroxide having the formula $Al_2O_3—3H_2O$ or $Al(OH)_3$ at temperatures above 250° C., but preferably not above 350° to 500° C., until substantially all of the water is removed and regular or cubic crystals are formed. Activated aluminia may also be formed by calcining boehmite which is the monohydrate of alumina, $Al_2O_3$—$H_2O$.

Activated alumina may also be prepared by precipitating aluminum hydroxide from a solution of a salt of aluminum, such as aluminum nitrate or aluminum chloride, by the addition of ammonium hydroxide or other alkaline precipitating agent, filtering the aluminum hydroxide, thereafter washing the aluminum hydroxide free of salts, drying, and finally calcining at a temperature of 500° to 1000° C.

Silica-aluminas which may be employed as the minor portion of the clay cement are the compounds known as silica-aluminas wherein the silica and alumina are chemically bonded together. These silica-aluminas may be characterized as having the following empirical formula:

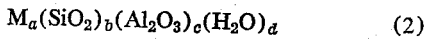

$$M_a(SiO_2)_b(Al_2O_3)_c(H_2O)_d \qquad (2)$$

where

M is an alkali or alkaline earth metal, and
$a=0-0.08$,
$b=0.7-1.56$,
$c=0.02-0.4$, and
$d=0.25-1.0$.

The silica-alumina preferably employed should have a value of "$a$" not substantially greater than 0.012.

The term "silica-alumina" does not include mere mechanical mixtures of unactivated silica and unactivated alumina. It has been found that mechanical mixtures of unactivated silica and unactivated alumina do not have the activity of silica-alumina as catalysts in reactions such as hydrocarbon conversion reactions. Similarly, in the present invention unactivated silica, unactivated alumina, or mechanical mixtures of unactivated silica and unactivated alumina in admixture with a clay which has gel strength properties do not have the unique properties shown with mixtures of activated silica, activated alumina, or silica-alumina and the same clay.

It is not essential that the silica-alumina be free of mechanically bonded metal oxides such as chromium oxide, thorium oxide, iron oxide, zirconium oxide, beryllium oxide, etc. However, it is desirable that the silica-alumina be substantially free of sodium ions.

Silica-aluminas which may be employed in the practice of the invention may be prepared in a variety of ways each of which is well known in the art of preparing silica-alumina catalysts. These silica-aluminas may be synthetic silica-aluminas or silica-aluminas prepared by treatment of clays.

Activated silica-alumina can be prepared by commingling solutions of sodium-silicate and aluminum sulfate in a nozzle to form a hydrosol, forcing the hydrosol mixture through the nozzle into hot kerosene or other oil so that spheres are formed, allowing the hydrosol to set therein to a firm hydrogel, washing the hydrogel free of electrolytes, drying at about 50° C. to 100° C. and finally activating by heating at temperatures between about 400° C. and 650° C.

Activated silica-alumina can also be prepared by adding an inorganic acid to a solution of sodium silicate in such a manner that a hydrosol is formed, allowing the hydrosol to set to a firm hydrogel, breaking the hydrogel into pieces and washing until free from electrolytes. This hydrogel is then ball-milled or otherwise intimately commingled with a desired amount of alumina ultrasol prepared by peptizing pure aluminum in a one percent solution of acetic acid in water, the intimate mixture of the hydrogel and hydrosol then being dried at a temperature between about 50° C. to 100° C. and activated by heating at a temperature between about 400° C. and 650° C.

Another procedure for preparing synthetic silica-alumina involves intimate physical commingling of silica and alumina while each is in a state of colloidal suspension, i. e., as a hydrosol or as a hydrogel. This may be effected by forming a solution of a silicon salt, such as sodium silicate, with a solution of a non-acidic aluminum salt, such as aluminum acetate, and converting the solution to a colloidal suspension of silica and alumina, as by the addition of acid. Intimate physical commingling may also be effected by admixing a silica hydrosol and an alumina hydrosol. Where the silica and the alumina are both in the form of hydrogels or one is in the form of a hydrogel and the other is in the form of a hydrosol, satisfactory commingling is obtained by admixture under conditions of vigorous agitation such as is obtained in a ball mill, a homogenizer, or a narrow orifice through which the mixture is passed at high pressure. Subsequent to intimate physical commingling, the resulting hydrogel is washed to remove substantially all water soluble compounds. The next step involves drying of the silica-alumina hydrogel which may be accomplished in accordance with conventional procedures of drying hydrogels, for example, by heating to a temperature of about 100° C. and maintaining this temperature until the water has been removed. Thereafter, the dried silica-alumina hydrogel is activated, likewise by conventional procedures, such as heating at a temperature of about 450° C. for about 18 hours.

Synthetic silica-alumina may also be prepared by forming a solution of a silicon salt, such as sodium silicate, and converting the solution to silica jelly, as by the addition of acid. The jelly is then washed with water to remove water soluble compounds. The washed jelly is next digested with a solution of a salt of aluminum, such as aluminum sulfate, after which it is again washed. The jelly is dried at a temperature, for example, of about 100° C. and after drying is heated to a temperature of about 450° C. for about 18 hours.

Another procedure for preparing activated synthetic silica-alumina involves admixture of a solution of a silicon salt such as sodium silicate, with a solution of an acid aluminum salt, such as aluminum nitrate, filtering the resulting jelly from the resulting mixture, washing the jelly, drying the jelly, and thereafter heating.

Silica-alumina which may be employed in the practice of the invention may be obtained by treating a clay, by which I mean a native hydrous silicate of alumina and characterized by the empirical Formula 1 given hereinabove. Included among the clays that may be employed are cyanite, andalusite, sillimanite, mullite, kaolin, kaolinite, atalpo, and fuller's earth. The clay may be treated to convert it to silica-alumina by any of the procedures heretofore employed to convert a similar clay to a silica-alumina catalyst for use in hydrocarbon conversion reactions. Included among these procedures are acid and heat treatment. The treatment is usually carried out by contacting the clay with aqueous solutions of mineral acid, such as hydrochloric acid or sulfuric acid, thereafter washing the clay with water to remove soluble compounds, drying, and then heating to a temperature of the order of 500° C. to 650° C. The clay is sometimes heated before treatment with acid to render the silica-alumina matrix more resistant and the impurities more susceptible to the treatment with acid.

Since the activated silica, activated alumina, or silica-alumina which may be a component of the clay cement can be activated silica, activated alumina, or silica-alumina which may be employed as a catalyst in hydrocarbon conversion reactions, a convenient source of these materials is waste activated silica, activated alumina, or silica-alumina, such as broken beads or attrition fines, obtained in the manufacture of catalysts for hydrocarbon conversion reactions. Similarly, waste catalyst or stack fines obtained from reactions employing activated silica, activated alumina, or silica-alumina as a catalyst may be employed after proper cleaning.

Activated silica, activated alumina, and silica-alumina may be obtained in various particle sizes or ranges of particle sizes. For use in the clay cement, the particles of the activated silica, activated alumina, and silica-alumina, should be sufficiently small to pass a 40 mesh screen and preferably sufficiently small to pass a 200 mesh screen.

An aqueous slurry of the clay cement is time-setting. An aqueous slurry of a clay which has gel strength properties will be time setting per se, i. e., the gel strength of the slurry will increase with time to a maximum as long as the slurry is quiescent and will decrease again upon mixing or agitation to approximately its initial value. However, an aqueous slurry of a clay which has gel strength properties and activated silica, activated alumina, or silica-alumina, i. e., the clay cement, will set to a consistency which is extremely high compared to the consistency of an aqueous slurry of the clay in the absence of the activated silica, activated alumina, or silica-alumina. Further, after setting of the clay cement, mixing or agitation, where such is possible depending upon the degree of set, has only slight effect on the consistency of the clay cement. Additionally, an aqueous slurry of the clay cement will have an initial consistency which is much less than the initial consistency of an aqueous slurry of the clay alone. Thus, the mixture is highly useful for any application where it is desirable or necessary to employ a material which is initially pumpable and which thereafter sets to a high consistency.

The amount of water to be admixed with the clay cement to form a slurry thereof will depend upon the desired consistency of the slurry. With larger amounts of water the consistency will be lower. Where the clay cement is to be employed for the correction of lost circulation, the amount of water ordinarily will not be greater than about 65 percent by weight of the slurry.

In the clay cement, the clay is in the greater proportion and the activated silica, activated alumina, or silica-alumina is in the minor proportion. I have found that with increasing amounts of activated silica, activated alumina, or silica-alumina in the clay cement, the degree of the final set of a slurry of the cement increases, passes through a maximum, and then decreases again, and with more than a certain maximum proportion of either activated silica, activated alumina, or silica-alumina depending upon the clay employed, the degree of the final set of a slurry of the cement is less than the degree of the final set that would be obtained with the clay alone. With the same activated silica, activated alumina, or silica-alumina and with the same clay, and with all other factors equal, the greatest degree of set of a slurry of the clay cement will be obtained where the activated silica, activated alumina, or silica-alumina is in an amount between about 4 and 5 percent by weight of the dry clay cement, and where the activated silica, activated alumina, or silica-alumina is in an amount greater than about 10 percent by weight of the dry clay cement the final set will be less than the final set that would be obtained with the clay alone. Thus, the amount of activated silica, activated alumina, or silica-alumina may be any amount up to about 10 percent by weight of the clay cement.

With silica-aluminas, the ratio of the silica to the alumina may vary depending upon the type of native hydrous silicate of alumina employed for preparing the silica-alumina or the amount of silicon salt and aluminum salt, or colloidal silica and colloidal alumina, employed for preparing synthetic silica-alumina. It has been found that the ratio of the silica to the alumina in the silica-alumina affects the degree of set of a slurry of the clay cement and accordingly when employing silica-alumina the degree of set may be controlled by employing silica-alumina having a selected ratio of silica to alumina. Generally stated, an increase in the amount of alumina in the silica-alumina results in an increased degree of set of a slurry of the clay cement.

The consistency of an aqueous slurry of the clay cement increases with time, as previously stated. Two factors have been found which affect the rate at which the consistency increases. These factors are temperature and extent of agitation. As the temperature of the slurry is increased, a higher rate of increase in consistency is obtained. Similarly, with greater extent of agitation, i. e., degree and time of agitation of the aqueous slurry of the clay cement prior to allowing the slurry to set, the rate of increase in consistency of the slurry during setting becomes greater.

Since the amount of activated silica, activated alumina, or silica-alumina, the ratio of silica to alumina where silica-alumina is employed, and the type of clay affect the degree of set of a slurry of the clay cement, control of the set with a given amount of clay and water may be made by varying these factors as desired. Further, by varying the temperature or extent of agitation, the time required to attain a desired consistency may also be controlled.

A slurry of the clay cement has particular use in the treatment of wells and in other operations wherein it is necessary to pump a material to a location wherein the material will set to a high consistency. In these operations, it is often desirable that the consistency of the material to be pumped be as low as possible in order to more readily effect pumping of the material to the desired location. For other reasons, also, it may be desirable that the material have a low initial consistency. In accordance with another feature of the invention, the initial viscosity and gel strength of an aqueous slurry of the clay cement may be reduced below the value it would otherwise have by admixing therewith a portion of a water soluble salt of a polyphosphoric acid or a complex metaphosphoric acid. Water soluble salts of hexametaphosphoric acid, pyrophosphoric acid, triphosphoric acid, and tetraphosphoric acid may be employed. Tetrasodium pyrophosphate has been found to be particularly suitable. The concentration of the water soluble salt may vary between .01 and 0.25 percent by weight of the clay in the cement depending upon the extent of reduction in viscosity and gel strength desired. It is preferred not to employ concentrations of the water soluble salt above about 0.25 percent by weight of the clay in the cement as high concentrations tend to reduce the final set of a slurry of the cement.

The following examples will be illustrative of the invention.

EXAMPLES 1 AND 2

These examples will illustrate the lower initial viscosity and gel strength of an aqueous slurry of clay cement, the clay cement containing clay having gel strength properties and silica-alumina, as compared with the initial viscosity and consistency of an aqueous slurry of the clay alone.

A clay cement containing 353.98 grams of McKittrick Light clay and 13.96 grams of silica-alumina was admixed with 432.06 grams of water to form a slurry thereof and 0.48 gram of anhydrous sodium pyrophosphate was added to the slurry. The slurry was vigorously mixed and immediately thereafter its viscosity and gel strength were measured. The table gives the results obtained.

In the table, and in the tables thereafter, unless otherwise stated, the viscosity is given in centipoises and the gel strength is given in grams Stormer. Where the gel strength is above 1000 grams, the Stormer instrument was not used but other methods for measuring gel strength were employed and the figures obtained were converted to equivalent Stormer grams.

Table I

| Example No. | Viscosity | Gel Strength |
|---|---|---|
| 1 | 291.5 | 300 |

Another slurry was prepared containing 368.14 grams of McKittrick Light clay, 0.48 gram of anhydrous sodium pyrophosphate, and 431.86 grams of water. The slurry was vigorously admixed and immediately thereafter its viscosity and gel strength were measured. The table gives the results obtained.

Table II

| Example No. | Viscosity | Gel Strength |
|---|---|---|
| 2 | 318.5 | 320 |

It will be observed from comparison of Tables I and II that the slurry of the clay cement had a lower viscosity and gel strength than the slurry of the clay.

EXAMPLES 3 TO 5

These examples will illustrate the water loss of clay cement.

In each example, clay cement consisting of McKittrick Light clay and silica-alumina was admixed with water to obtain a slurry thereof, the ratio of water to clay cement being different for each example. After preparing the slurries, the water loss of each was determined by the standard API test employed for determining water loss of drilling fluids.

The table gives the weight ratio of water to clay cement in the slurries and the corrected 30-minute API water loss. The water loss is expressed in cubic centimeters.

Table III

| Example No. | Ratio of Water to Clay Cement | Water Loss |
|---|---|---|
| 3 | 3 to 1 | 12 |
| 4 | 2.3 to 1 | 9 |
| 5 | 1.9 to 1 | 7 |

EXAMPLES 6 AND 7

In these examples, the effect of a water soluble salt of a polyphosphoric acid on the initial viscosity and gel strength of a slurry of clay cement will be illustrated.

In Example 6, clay cement consisting of 353.98 grams of McKittrick Light clay and 13.96 grams of silica-alumina was admixed with 432.06 grams of water. In Example 7, a similar slurry was prepared except that the clay cement employed contained 0.48 gram of anhydrous sodium pyrophosphate. Immediately after preparing the slurries, their viscosities and initial gel strengths were measured. The table gives the viscosities and the gel strengths of the slurries.

Table IV

| Example No. | Viscosity | Initial Gel Strength |
|---|---|---|
| 6 | Too high to measure | 1,000 |
| 7 | 292 | 300 |

EXAMPLES 8 TO 11

These examples will be illustrative of the initial gel strengths and the gel strengths after a certain setting time of slurries of clay cement having different compositions. The initial gel strengths of the slurries were measured immediately after preparation. The slurries were then aged at 170° F. for 24 hours and the gel strength of each slurry again measured. The table gives the compositions of the slurries and the initial gel strengths immediately after preparation and the gel strengths after the setting time.

Table V

| Example No. | Composition of Slurry—grams | | Gel Strength Before Setting, gr. | Gel Strength After Setting, gr. |
|---|---|---|---|---|
| 8 | Clay | 353.98 | 310 | 70,664 |
| | Activated Silica | 13.26 | | |
| | Activated Alumina | 0.70 | | |
| | Water | 432.06 | | |
| | Sodium Pyrophosphate | 0.48 | | |
| 9 | Clay | 353.98 | 280 | 79,398 |
| | Activated Silica | 13.96 | | |
| | Water | 432.06 | | |
| | Sodium Pyrophosphate | 0.48 | | |
| 10 | Clay | 353.98 | 660 | 106,706 |
| | Activated Alumina | 13.96 | | |
| | Water | 432.06 | | |
| | Sodium Pyrophosphate | 0.48 | | |
| 11 | Clay | 353.98 | 300 | 86,400 |
| | Silica-Alumina | 13.96 | | |
| | Water | 432.06 | | |
| | Sodium Pyrophosphate | 0.48 | | |

EXAMPLES 12 TO 14

Examples 12 to 14 will show the increase in degree of set with time and with temperature of slurries of clay cement. In each example, a clay cement consisting of 219.13 grams of McKittrick Light clay and 34.56 grams of silica-alumina was admixed with 546.31 grams of water. Each slurry was aged at a different temperature and the gel strength of each slurry was measured at different times during aging. The table gives the aging temperature and the gel strength of the slurries at various times of aging.

Table VI

| Example No. | Temperature of Aging, °F. | Time of Aging, hours | Gel Strength |
|---|---|---|---|
| 12 | 104 | 5 | 3,500 |
| | | 15 | 5,750 |
| | | 24 | 7,000 |
| | | 48 | 7,500 |
| 13 | 145 | 5 | 6,000 |
| | | 15 | 6,900 |
| | | 24 | 7,500 |
| | | 48 | 9,000 |
| 14 | 170 | 5 | 7,500 |
| | | 15 | 10,000 |
| | | 24 | 12,500 |
| | | 48 | 15,000 |

It will be observed from the table that the degree of set of the slurry increases with both the time and temperature of setting.

It may be desirable in some instances to reduce the consistency of the slurry of clay cement after it has set. For example, it may be desirable to remove the clay cement from a location where it has been placed and this may be most conveniently accomplished by reducing the consistency of the clay cement to a point where it becomes sufficiently fluid to flow or to be washed away. The consistency of the set clay cement may be reduced as desired by contacting with an aqueous caustic solution. Suitable aqueous solutions which may be employed include those of sodium hydroxide and potassium hydroxide, although sodium hydroxide is to be preferred in view of its economy.

A slurry of the clay cement may be used for various purposes. It has been found to be particularly useful, however, for the correction of lost returns in the drilling of wells, as previously stated. Because of the fact that its initial consistency is low, it may be pumped to the loss zone, and it will therein set to a high consistency within a reasonably short time whereby waiting time is minimized. Further, because of its low water loss, a flash set will not occur to cause sticking of the drill pipe, and since clay, activated silica, activated alumina, or silica-alumina, and water soluble salt of a polyphosphoric or a complex metaphosphoric acid when employed, is not incompatible with drilling fluid, drilling of the plug in the bore hole following correction of lost returns will not deleteriously effect the drilling fluid. An increase in viscosity of the drilling fluid may be observed but this may be corrected simply by addition of water. Additionally, since the set slurry does not have the hardness of Portland cements, the difficulties arising from deviation of the bore hole upon drilling out of the plug are eliminated. It has also been found that the use of a slurry of clay cement frequently results in correction of lost returns where previous attempts to correct the lost returns resulted in failure.

For correction of lost returns, a slurry of clay cement is pumped or otherwise placed in the bore hole opposite the loss zone and into the interstices or fractures of the formation or formations constituting the loss zone. Generally, these operations are similar to the operations involved in correcting lost returns with ordinary cements. A typical operation for correction of lost returns involves first forming the clay cement slurry. This may conveniently be accomplished by placing the dry ingredients of the clay cement in the desired proportions in a hopper and jetting the water in the desired proportion into the dry ingredients as they leave the hopper. The clay cement slurry thus formed is pumped directly into the drill pipe which has been run to a point opposite or near as possible to the loss zone. Normally, pumping of clay cement slurry is continued until return of drilling fluid is obtained. However, where pumping of clay cement slurry is continued until return of drilling fluid is obtained, the drill pipe will be filled with clay cement slurry after completion of the operation which represents a waste of clay cement. Alternatively, therefore, a desired amount of clay cement slurry may be pumped into the drill pipe followed with drilling fluid to displace the slurry therefrom. If correction of lost returns is not immediately obtained with the amount of clay cement slurry employed, a short waiting time, which may be of the order of thirty minutes, may be allowed for the set of the slurry to increase and then drilling fluid is pumped through the drill pipe to determine whether return of drilling fluid has been obtained. If drilling fluid return is not obtained, further clay cement slurry may be placed at the loss zone. If, however, returns are obtained and it is desired to secure further the loss zone, the drill pipe may be pulled up out of the clay cement slurry in the bore hole, the drill pipe cleared of drilling fluid, clay cement slurry pumped into the drill pipe to the end thereof, the drill pipe lowered to its original position, and the clay cement slurry pumped to the loss zone.

When return of drilling fluid is obtained, a pressure should be imposed, with the preventers closed, within the annulus between the drill pipe and the walls of the bore hole or casing, the pressure being equal to the pressure which the loss zone is expected to withstand during further drilling operations. The imposition of this pressure is desirable inasmuch as it apparently causes a better bond between the clay cement slurry and the formation. The pressure is preferably imposed for the duration of the setting time and the preventers are opened and the drill pipe is withdrawn from the bore hole.

The clay cement slurry is then permitted to set. The time required to obtain a desired degree of set is dependent upon the temperature within the bore hole at the location of the clay cement slurry. Where the bore hole temperature is above 150° F., a waiting time of only one to three hours will result in attainment of a satisfactory degree of set. Where the bore hole temperature is below 150° F., a proportionately greater waiting time up to about ten hours will be required. If desired, the waiting time required to attain a desired degree of set may be determined by bringing samples of the clay cement slurry employed to the same temperature as that of the clay cement slurry in the bore hole and measuring the time required for the samples to attain the desired degree of set.

Following setting of the clay cement slurry, the plug of slurry in the bore hole is drilled out and drilling of the well is continued.

The following examples are illustrative of the results obtained employing clay cement slurry for the correction of lost returns.

EXAMPLES 15 TO 20

In each example, lost returns encountered in the drilling of wells for petroleum oil were corrected by treating the well with an aqueous slurry of clay cement, the clay cement consisting of McKittrick Light clay, silica-alumina, and anhydrous sodium pyrophosphate. The method of placing the slurry in each example was as described above. The table gives the depth at which the loss zone was encountered and the clay cement slurry placed, the formation temperature, the type of loss zone, the amount of clay cement slurry placed, the rate of loss of drilling fluid prior to treatment of the well with the slurry, and the rate of loss of drilling fluid subsequent to treatment of the well with the clay cement slurry.

*Table VII*

| Example No. | 15 | 16 | 17 | 18 | 19 | 20 |
|---|---|---|---|---|---|---|
| Depth of Loss Zone, Feet | 6,520–6,760 | 5,500–6,650 | 400–685 | 4,230 | 5,655 | 10,600–11,000. |
| Formation Temperature, °F | 110 | 110 | 70 | 200 | 200 | 200. |
| Type of Loss Zone | Fractures | Fractures | Fractures in Salt. | Broken limestone. | Broken limestone. | Fractures. |
| Amount of Slurry Placed, bbls | 125 | 522 | 225 | 177 | 34 | 112. |
| Drilling Fluid Loss Before Treatment, Bbls. per hr. | 25 | Complete | Complete | Complete | Complete | 600. |
| Drilling Fluid Loss After Treatment. | None | None | None | None | None | None. |

Clay cement is also effective for other purposes. In connection with wells, in addition to correction of lost returns, a slurry of clay cement is highly useful in recompletion, acidizing, and selective plugging. In recompletion or acidizing of wells, it is often necessary or desirable to protect the earth formations below the formation to be subjected to the recompletion or acidizing treatment from the effects of the treatment and this may be accomplished by placing the clay cement slurry in the bore hole to fill the bore hole opposite the formation to be protected. The recompletion or acidizing operations may be carried out above the section of the bore hole filled with the clay cement slurry after which the set clay cement slurry is removed by drilling out or by washing with caustic solution. In water flooding operations and gas drive operations for the increased recovery of petroleum oil from a subterranean reservoir, the water or gas forced into an injection well leading to the reservoir may encounter high permeability formations and flow into these formations to the exclusion in varying degrees of the oil-containing formation. Selective plugging of these high permeability formations may be effected by placing clay cement slurry in the well opposite these formations, squeezing into the formations, and, after setting of the clay cement slurry, drilling through the plug of clay cement slurry remaining in the bore hole.

Clay cement has additional uses. For example, a slurry of clay cement may be employed to plug holes in well casings, to cement casing strings in place, and to protect casing strings from corrosion by placing a sheath of the clay cement slurry around the string at points subject to corrosion. Also, the clay cement may be employed for walling seismic shot holes which would otherwise suffer excessive drilling fluid losses.

Various additives may be admixed with the clay cement for various purposes. For example, fibrous or shredded materials such as bagasse, straw, paper, strips of cellophane, wood shavings, corn stalk, bamboo, cotton seed hulls, flax seed, mica flakes, ground rubber pulp, hemp, etc., may be added to the clay cement. Other materials may also be added such as popped perlite, silica or alumina as opposed to activated silica or activated alumina, mechanical mixtures of silica and alumina, barytes, pumice, iron oxide, etc.

Having thus described my invention, it will be understood that such description has been given by way of illustration and example and not by way of limitation, reference for the latter purpose being had to the appended claims.

This application is a continuation-in-part of application Serial Number 80,563, filed March 9, 1949, now abandoned.

I claim:

1. Clay cement comprising a clay having gel strength properties and a compound selected from the group consisting of activated silica, activated alumina, and silica-alumina in an amount not greater than about ten percent by weight of said clay cement, said silica-alumina having the formula $M_a(SiO_2)_b(Al_2O_3)_c(H_2O)_d$, where M is selected from the group consisting of the alkali and alkaline earth metals and $a=0-0.08$, $b=0.7-1.56$, $c=0.02-0.4$, and $d=0.25-1.0$.

2. Clay cement comprising McKittrick Light clay, a compound selected from the group consisting of activated silica, activated alumina, and silica-alumina in an amount not greater than about 10 percent by weight of said clay cement, said silica-alumina having the formula $$M_a(SiO_2)_b(Al_2O_3)_c(H_2O)_d$$

where M is selected from the group consisting of the alkali and alkaline earth metals and $a=0-0.08$, $b=0.7-1.56$, $c=0.02-0.4$, and $d=0.25-1.0$, and a water soluble salt selected from the group consisting of the polyphosphoric and complex metaphosphoric acids.

3. Clay cement comprising McKittrick Light clay and a compound selected from the group consisting of activated silica, activated alumina, and silica-alumina in an amount not greater than about ten percent by weight of said clay cement, said silica-alumina having the formula $M_a(SiO_2)_b(Al_2O_3)_c(H_2O)_d$, where M is selected from the group consisting of the alkali and alkaline earth metals and $a=0-0.08$, $b=0.7-1.56$, $c=0.02-0.4$ and $d=0.25-1.0$.

4. Clay cement comprising McKittrick Light clay, a compound selected from the group consisting of activated silica, activated alumina, and silica-alumina in an amount not greater than about ten percent by weight of said clay cement, said silica-alumina having the formula $M_a(SiO_2)_b(Al_2O_3)_c(H_2O)_d$, where M is selected from the group consisting of the alkali and alkaline earth metals and $a=0-0.08$, $b=0.7-1.56$, $c=0.02-0.4$ and $d=0.25-1.0$, and in an amount not greater than about 0.25 percent by weight of said clay a water soluble salt of an acid selected from the group consisting of the polyphosphoric and complex metaphosphoric acids.

5. A method of correcting lost returns of drilling fluid in the drilling of a well into the earth comprising placing in said well at a location where drilling fluid is being lost from said well into an earth formation a slurry of clay cement comprising a clay having gel strength properties, a compound selected from the group consisting of activated silica, activated alumina, and silica-alumina in an amount not greater than about 10 percent by weight of said clay cement, said silica-alumina having the formula $M_a(SiO_2)_b(Al_2O_3)_c(H_2O)_d$, where M is selected from the group consisting of the alkali and alkaline earth metals and $a=0-0.08$, $b=0.7-1.56$, $c=0.02-0.4$, and $d=0.25-1.0$, and water in an amount not greater than about 65 percent by weight of said slurry.

6. Clay cement comprising McKittrick Light clay and a compound selected from the group consisting of activated silica, activated alumina, and silica-alumina in an amount between about four and five percent by weight of said clay cement, said silica-alumina having the formula $M_a(SiO_2)_b(Al_2O_3)_c(H_2O)_d$, where M is selected from the group consisting of the alkali and alkaline earth metals and $a=0-0.08$, $b=0.7-1.56$, $c=0.02-0.4$, and $d=0.25-1.0$.

7. Clay cement comprising McKittrick Light clay, a compound selected from the group consisting of activated silica, activated alumina, and silica-alumina in an amount between about 4 and 5 percent by weight of said clay cement, said silica-alumina having the formula $$M_a(SiO_2)_b(Al_2O_3)_c(H_2O)_d$$

where M is selected from the group consisting of the alkali and alkaline earth metals and $a=0-0.08$, $b=0.7-1.56$ $c=0.02-0.4$, and $d=0.25-1.0$, and a water soluble salt of an acid selected from the group consisting of the polyphosphoric and complex metaphosphoric acids.

8. Clay cement comprising McKittrick Light clay, a compound selected from the group consisting of activated silica, activated alumina, and silica-alumina in an amount between about 4 and 5 percent by weight of said clay cement, said silica-alumina having the formula $$M_a(SiO_2)_b(Al_2O_3)_c(H_2O)_d$$

where M is selected from the group consisting of the alkali and alkaline earth metals and $a=0-0.08$, $b=0.7-1.56$, $c=0.02-0.4$, and $d=0.25-1.0$, and a water-soluble salt of an acid selected from the group consisting of the polyphosphoric and complex metaphosphoric acids in an amount not greater than about 0.25 percent by weight of said clay.

9. A method of correcting lost returns of drilling fluid in the drilling of a well into the earth comprising placing in said well at a location where drilling fluid is being lost from said well into an earth formation a slurry of a clay cement comprising McKittrick Light clay, a compound selected from the group consisting of activated silica, activated alumina, and silica-alumina in an amount not greater than about 10 percent by weight of said clay cement, said silica-alumina having the formula $$M_a(SiO_2)_b(Al_2O_3)_c(H_2O)_d$$

where M is selected from the group consisting of the alkali and alkaline earth metals and $a=0-0.08$, $b=0.7-1.56$, $c=0.02-0.4$, and $d=0.25-1.0$, and water in an amount not greater than about 65 percent by weight of said slurry.

10. A method of correcting lost returns of drilling fluid in the drilling of a well into the earth comprising placing in said well at a location where drilling fluid is being lost from said well into an earth formation a slurry of a clay cement comprising McKittrick Light clay, a compound selected from the group consisting of activated silica, activated alumina, and silica-alumina in an amount not greater than about 10 percent by weight of said clay cement, said silica-alumina having the formula $$M_a(SiO_2)_b(Al_2O_3)_c(H_2O)_d$$

where M is selected from the group consisting of the alkali and alkaline earth metals and $a=0-0.08$, $b=0.7-1.56$, $c=0.02-0.4$, and $d=0.25-1.0$, a water-soluble salt of an acid selected from the group consisting of the polyphosphoric and complex metaphosphoric acids, and water in an amount not greater than about 65 percent by weight of said slurry.

11. A method of correcting lost returns of drilling fluid in the drilling of a well into the earth comprising placing in said well at a location where drilling fluid is being lost from said well into an earth formation a slurry of a clay cement comprising McKittrick Light clay, a compound selected from the group consisting of activated silica, activated alumina, and silica-alumina in an amount not greater than about 10 percent by weight of said clay cement, said silica-alumina having the formula $$M_a(SiO_2)_b(Al_2O_3)_c(H_2O)_d$$

where M is selected from the group consisting of the alkali and alkaline earth metals and $a=0-0.08$, $b=0.7-1.56$, $c=0.02-0.4$, and $d=0.25-1.0$, a water-soluble salt of an acid selected from the group consisting of the polyphosphoric and complex metaphosphoric acids in an amount not greater than about 0.25 percent by weight of said clay, and water in an amount not greater than about 65 percent by weight of said slurry.

12. A method of correcting lost returns of drilling fluid in the drilling of a well into the earth comprising placing in said well at a location where drilling fluid is being lost from said well into an earth formation a slurry of a clay cement comprising McKittrick Light clay, a compound selected from the group consisting of activated silica, activated alumina, and silica-alumina in an amount between about 4 and 5 percent by weight of said clay cement, said silica-alumina having the formula $$M_a(SiO_2)_b(Al_2O_3)_c(H_2O)_d$$

where M is selected from the group consisting of the alkali and alkaline earth metals and $a=0-0.08$, $b=0.7-1.56$, $c=0.02-0.4$, and $d=0.25-1.0$, and water in an amount not greater than about 65 percent by weight of said slurry.

13. A method of correcting lost returns of drilling fluid in the drilling of a well into the earth comprising placing in said well at a location where drilling fluid is being lost from said well into earth formation a slurry of a clay cement comprising McKittrick Light clay, a compound selected from the group consisting of activated silica, activated alumina, and silica-alumina in an amount between about 4 and 5 percent by weight of said clay cement, said silica-alumina having the formula $$M_a(SiO_2)_b(Al_2O_3)_c(H_2O)_d$$

where M is selected from the group consisting of the alkali and alkaline earth metals and $a=0-0.08$, $b=0.7-1.56$, $c=0.02-0.4$, and $d=0.25-1.0$, a water-soluble salt of an acid selected from the group consisting of the polyphosphoric and complex metaphosphoric acids, and water in an amount not greater than about 65 percent by weight of said slurry.

14. A method of correcting lost returns of drilling fluid in the drilling of a well into the earth comprising placing in said well at a location where drilling fluid is being lost from said well into an earth formation a slurry of a clay cement comprising McKittrick Light clay, a compound selected from the group consisting of activated silica, activated alumina, and silica-alumina in an amount between about 4 and 5 percent by weight of said clay cement, said silica-alumina having the formula $$M_a(SiO_2)_b(Al_2O_3)_c(H_2O)_d$$

where M is selected from the group consisting of the alkali and alkaline earth metals and $a=0-0.08$, $b=0.7-1.56$, $c=0.02-0.4$, and $d=0.25-1.0$, a water-soluble salt of an acid selected from the group consisting of the polyphosphoric and complex metaphosphoric acids in an amount not greater than about 0.25 percent by weight of said clay, and water in an amount not greater than about 65 percent by weight of said slurry.

References Cited in the file of this patent

UNITED STATES PATENTS

| Number | Name | Date |
|---|---|---|
| 1,830,934 | Curtis | Nov. 10, 1931 |
| 2,131,338 | Vail | Sept. 27, 1938 |
| 2,146,693 | Vietti et al. | Feb. 7, 1939 |
| 2,193,144 | Rymal | Mar. 12, 1940 |
| 2,213,038 | David | Aug. 27, 1940 |
| 2,281,810 | Stone | May 5, 1942 |
| 2,304,232 | Ayers | Dec. 8, 1942 |
| 2,320,954 | Sullivan | June 1, 1943 |
| 2,410,954 | Sharp | Nov. 12, 1946 |
| 2,487,065 | Milliken | Nov. 8, 1949 |
| 2,489,333 | Shabaker et al. | Nov. 29, 1949 |